United States Patent
Litzenberger et al.

(10) Patent No.: US 10,035,303 B2
(45) Date of Patent: Jul. 31, 2018

(54) METHOD AND DEVICE FOR JOINING COMPONENTS

(75) Inventors: Karsten Litzenberger, Harsefeld (DE); Klaus Edelmann, Bremen (DE); Matthias Schweim, Schmalfeld (DE); Rainer Schildt, Oederquart (DE)

(73) Assignee: Airbus Operations GmbH, Hamburg (DE)

( * ) Notice: Subject to any disclaimer, the term of this patent is extended or adjusted under 35 U.S.C. 154(b) by 55 days.

(21) Appl. No.: 13/399,339

(22) Filed: Feb. 17, 2012

(65) Prior Publication Data
US 2012/0211144 A1    Aug. 23, 2012

Related U.S. Application Data

(63) Continuation of application No. PCT/EP2010/061076, filed on Jul. 30, 2010.
(Continued)

(30) Foreign Application Priority Data

Aug. 18, 2009   (DE) .................. 10 2009 028 613

(51) Int. Cl.
*B29C 65/54*   (2006.01)
*B29C 65/00*   (2006.01)
(Continued)

(52) U.S. Cl.
CPC ............ *B29C 66/721* (2013.01); *B29C 65/08* (2013.01); *B29C 65/14* (2013.01);
(Continued)

(58) Field of Classification Search
CPC ......... B32B 37/00; B32B 37/06; B32B 37/12; C08K 3/00; C08K 3/18; C08K 3/20;
(Continued)

(56) References Cited

U.S. PATENT DOCUMENTS 3,526,554 A     9/1970  Obeda
3,574,031 A  *  4/1971  Heller, Jr. et al. ......... 156/272.2
(Continued)

FOREIGN PATENT DOCUMENTS

DE         6925099 U    12/1969
DE       102004004764    9/2005
(Continued)

OTHER PUBLICATIONS

N. Senapati, R. Moulder, "Ultrasonic process for curing adhesives", Mar. 1993, Interim Report for the Materials Directorate, Wright Laboratory, Air Force Material Command, pp. 1-34.*
(Continued)

*Primary Examiner* — Michael N Orlando
*Assistant Examiner* — Elizabeth Bradford
(74) *Attorney, Agent, or Firm* — Jenkins, Wilson, Taylor & Hunt, P.A.

(57) ABSTRACT

A method for joining a first and a second component, at least one of which comprises a fiber-reinforced plastics material. The components are arranged in relation to one another in such a way that a gap region remains between the first and the second component. The gap region is filled, at least in portions, with an uncured plastics material filler in which nanoparticles are dispersed. Energy is introduced locally into the nanoparticles in order to cure the plastics material filler. In another aspect, the invention provides a device for joining two components.

19 Claims, 2 Drawing Sheets

Related U.S. Application Data

(60) Provisional application No. 61/234,780, filed on Aug. 18, 2009.

(51) Int. Cl.

| | | |
|---|---|---|
| *B29C 65/08* | (2006.01) | |
| *B29C 65/14* | (2006.01) | |
| *B29C 65/48* | (2006.01) | |
| *C08J 5/12* | (2006.01) | |
| *C09J 5/00* | (2006.01) | |
| *C09J 5/06* | (2006.01) | |
| *B29C 65/36* | (2006.01) | |
| *B64F 5/10* | (2017.01) | |
| *B29C 35/02* | (2006.01) | |
| *B29C 35/08* | (2006.01) | |
| *B29K 63/00* | (2006.01) | |
| *B29K 105/06* | (2006.01) | |
| *B29K 305/10* | (2006.01) | |
| *B29K 307/00* | (2006.01) | |
| *B29L 9/00* | (2006.01) | |
| *B29L 31/30* | (2006.01) | |

(52) U.S. Cl.
CPC ...... *B29C 65/1425* (2013.01); *B29C 65/1435* (2013.01); *B29C 65/1467* (2013.01); *B29C 65/3612* (2013.01); *B29C 65/3668* (2013.01); *B29C 65/4835* (2013.01); *B29C 65/4875* (2013.01); *B29C 66/1122* (2013.01); *B29C 66/545* (2013.01); *B29C 66/612* (2013.01); *B29C 66/723* (2013.01); *B29C 66/861* (2013.01); *B29C 66/919* (2013.01); *B29C 66/91411* (2013.01); *B29C 66/91651* (2013.01); *B64F 5/10* (2017.01); *C08J 5/121* (2013.01); *C09J 5/00* (2013.01); *C09J 5/06* (2013.01); *B29C 35/02* (2013.01); *B29C 35/0261* (2013.01); *B29C 65/1409* (2013.01); *B29C 65/1412* (2013.01); *B29C 65/368* (2013.01); *B29C 65/3656* (2013.01); *B29C 65/485* (2013.01); *B29C 65/489* (2013.01); *B29C 65/4855* (2013.01); *B29C 65/4885* (2013.01); *B29C 66/71* (2013.01); *B29C 66/7212* (2013.01); *B29C 66/72321* (2013.01); *B29C 66/91655* (2013.01); *B29C 2035/0811* (2013.01); *B29C 2035/0822* (2013.01); *B29C 2035/0855* (2013.01); *B29K 2063/00* (2013.01); *B29K 2105/06* (2013.01); *B29K 2305/10* (2013.01); *B29K 2307/00* (2013.01); *B29K 2995/0005* (2013.01); *B29K 2995/0013* (2013.01); *B29L 2009/003* (2013.01); *B29L 2031/3082* (2013.01); *C09J 2201/602* (2013.01); *C09J 2205/31* (2013.01); *C09J 2400/22* (2013.01); *C09J 2400/226* (2013.01)

(58) Field of Classification Search
CPC .............. C08K 3/22; C08K 2003/0812; C08K 2003/18; C08K 2003/12; C08K 2003/2227; C08K 2201/011; C09J 5/06; C09J 2203/00; C09J 2203/10; C09J 2201/622; C09J 2400/16
USPC .............. 156/272.2, 275.5, 275.7, 304.1, 325
See application file for complete search history.

(56) References Cited

U.S. PATENT DOCUMENTS

| | | | | |
|---|---|---|---|---|
| 3,668,176 | A * | 6/1972 | Childress .................. | 252/62.54 |
| 6,355,127 | B1 * | 3/2002 | Mahdi et al. ................ | 156/155 |
| 6,385,836 | B1 * | 5/2002 | Coltrin ...................... | 29/402.18 |
| 8,287,681 | B2 * | 10/2012 | Girshovich et al. ......... | 156/252 |
| 2004/0014860 | A1 * | 1/2004 | Meier et al. ................. | 524/394 |
| 2004/0157002 | A1 * | 8/2004 | Bons .................. | C08G 18/0885 |
| | | | | 427/487 |
| 2006/0002746 | A1 | 1/2006 | Darcy, III et al. | |
| 2006/0167164 | A1 * | 7/2006 | Sugioka et al. .............. | 524/492 |
| 2006/0289113 | A1 * | 12/2006 | Cura ......................... | C09J 5/06 |
| | | | | 156/272.4 |
| 2006/0289841 | A1 * | 12/2006 | Ito et al. ...................... | 252/512 |

FOREIGN PATENT DOCUMENTS

| | | | |
|---|---|---|---|
| DE | 102008044208 | 6/2010 | |
| WO | WO 03/070838 A1 | 8/2003 | |
| WO | WO 2005073329 | 8/2005 | |
| WO | WO 2009047010 | 4/2009 | |
| WO | WO-2009047010 A2 * | 4/2009 | ......... B29C 65/3476 |

OTHER PUBLICATIONS

International Search Report dated May 11, 2010 for Application Serial No. WO 2011020687 (PCT/EP2008/008664).
Chinese Office Action for Application No. 201080046785.6 dated Dec. 4, 2013.
German Office Action for Application No. 102009028613 dated Sep. 5, 2016.
Chinese Reexamination Notification for Application No. 201080046785.6 dated Jul. 10, 2015.
IPRP with Written Opinion and International Search Report for Application No. PCT/EP2010/061076 dated Mar. 27, 2012.
European Office Action for Application No. 107739898.4 dated Apr. 10, 2014.

* cited by examiner

METHOD AND DEVICE FOR JOINING COMPONENTS

CROSS-REFERENCE TO RELATED APPLICATIONS

This application is a continuation of and claims priority to PCT/EP2010/061076 filed Jul. 30, 2010, which claims the benefit of and priority to U.S. Provisional Application No. 61/234,780, filed Aug. 18, 2009 and German Patent Application No. 10 2009 028 613.6 filed Aug. 18, 2009, the entire disclosures of which are herein incorporated by reference.

FIELD OF THE INVENTION

The present invention relates to a method for joining components, at least one of which comprises a fibre-reinforced plastics material. The invention also relates to a device for joining components.

Although the present invention and the problem on which is it based can be applied to any components, they will be described in detail with reference to fuselage shell components of an aircraft.

Fibre-reinforced composite materials, for example carbon-fibre-reinforced epoxy resins, are increasingly being used in modern aircraft construction. Fuselage sections for producing aircraft fuselages are made for example using shell segments, which are predominantly produced using fibre-reinforced composite materials. However, in contrast to conventional aluminium construction, in the case of composite materials of this type unavoidable production tolerances arise, which stem for example from shrinkage behaviour which cannot reliably be reproduced when curing large components. Dimensional differences also occur in the case of aluminium construction, but owing to the ductile properties of the aluminium alloys used these differences can be compensated, for example by pressing or drawing. However, this approach cannot be applied to composite materials owing to the high brittleness thereof after curing. Therefore, other compensation measures must be taken when joining shell segments to form fuselage sections and subsequently forming complete aircraft fuselage cells by joining a plurality of fuselage sections.

In order to compensate the dimensional differences, which are unavoidable owing to the production process, a liquid shim is generally used for filling the gaps and for tolerance compensation between the composite components to be joined. This liquid shim is generally a curable two-component plastics material, for example an epoxy resin, to which further fillers and/or additives can optionally be added. Currently, the shim is usually dried and cured at ambient temperature in such a way that, in the case of a two-component epoxy resin, a process time of several hours (generally between four and nine hours) is needed for chemical-physical reasons.

The shim which is introduced into the unavoidable joining gaps is occasionally cured in an accelerated manner via electrically heatable mats which are applied in the joint region. However, these mats require a high energy input and lead to uncontrolled heating of adjacent regions. In addition, the temperature gradient which can be achieved in the gap region by means of heating mats cannot be controlled instantaneously owing to the thermal inertia of the heating mats, and the arrangement of the heating mats involves high labour costs.

SUMMARY OF THE INVENTION

It is therefore an object of the present invention to make it possible to cure liquid shim in a rapid, precise and controllable manner when joining components.

The idea on which the present invention is based consists in dispersing nanoparticles in a curable plastics material filler, which is used as liquid shim for filling the gap region between two or more components, in such a way that energy can be introduced locally into the nanoparticles in a targeted manner from the outside in order to cure the plastics material. In this case, the term "nanoparticles" is to be understood to mean solid particles having a diameter of from approximately 1 nm to 100 nm. The nanoparticles and the form of energy introduced are preferably matched to one another, in such a way that a high level of energy absorption by the nanoparticles is accompanied by a level of energy absorption by the components which is as low as possible.

The small size of the nanoparticles makes it possible to form a particularly stable dispersion with the plastics material filler. Owing to the fact that the energy is introduced locally into the nanoparticles dispersed in the plastics material filler, rapid heating which is limited accurately in space in the gap region between the components to be joined and thus very precise curing of the plastics material filler, for example of a two-component plastics material used, is possible within a short time of less than 30 min. In addition, the effect of heat can be limited accurately in time by controlling the introduction of energy in a suitable manner.

The plastics material is, for example, a filler and/or a sealant such as a two-component epoxy resin, to which further additives can optionally be added. Possible sealants include, for example, conventional two-component polyurethanes.

Advantageous embodiments and improvements of the invention can be found in the dependent claims.

According to a preferred development, the gap region has a width of from 0.3 mm to 2 mm.

According to a preferred development, the nanoparticles, the plastics material filler and the type of energy introduced are selected in such a way that the plastics material filler is heated in a targeted manner by the local introduction of energy and cures in an accelerated manner owing to the effect of the heat. The plastics material filler is preferably heated to between 40° C. and 90° C. in order to cure the plastics material filler in a particularly rapid and gentle manner.

According to a preferred development, the nanoparticles, the plastics material filler and the type of energy introduced are selected in such a way that—in addition or alternatively to heating—the local introduction of energy stimulates a chemical reaction in the plastics material filler, which reaction is catalysed by the nanoparticles, in order to cure the plastics material filler. In this way, particularly short curing times can be achieved.

According to a preferred development, energy is introduced locally by exciting the nanoparticles by means of sound waves, preferably ultrasonic waves.

According to a preferred development, energy is introduced locally by exciting the nanoparticles by means of electromagnetic radiation. Preferred types of electromagnetic radiation are, for example, light, infrared and/or microwave radiation.

According to a preferred development, energy is introduced locally by exciting the nanoparticles by means of an electromagnetic induction field.

According to a preferred development, energy is introduced locally through the first and/or second component. In this way, the plastics material filler can be cured even in gaps which are difficult or even impossible to access from the outside.

According to a preferred development, the solid particles have a particle size of from 1 nm to 100 nm. Particles of this type are usually referred to as nanoparticles.

According to a preferred development, the nanoparticles comprise an electrically conductive, for example metallic, material, in such a way that electric currents can be produced inside the plastics material filler by introducing energy locally. The material preferably has a low density, in order to achieve a low final weight of the joined components.

According to a preferred development, the nanoparticles comprise a material having a high thermal conductivity which is preferably higher than the thermal conductivity of the plastics material filler. In this way, heat resulting from the local introduction of energy into the nanoparticles reaches the surface of the particles, and thus enters the plastics material filler, particularly quickly.

According to a preferred development, the nanoparticles comprise a ferrite and/or a boehmite as a material.

The device according to the invention can optionally be equipped with only one energy introduction means or with a plurality of energy introduction means. When using only one energy introduction means, said means can be moved into an adjacent portion after the respectively treated portion or region has been cured, whereby the labour costs increase. In order to avoid incompletely cured regions, an overlapping method of working is generally required, whereby the time requirement increases further. On the other hand, however, although a device which is equipped with a plurality of simultaneously operating energy introduction means makes it possible to cure large gap regions simultaneously, it is constructionally more complex.

BRIEF DESCRIPTION OF THE DRAWINGS

The invention will be described in detail below by way of embodiments with reference to the accompanying figures of the drawings, in which.

DESCRIPTION OF EXEMPLARY EMBODIMENTS

Figure 1:
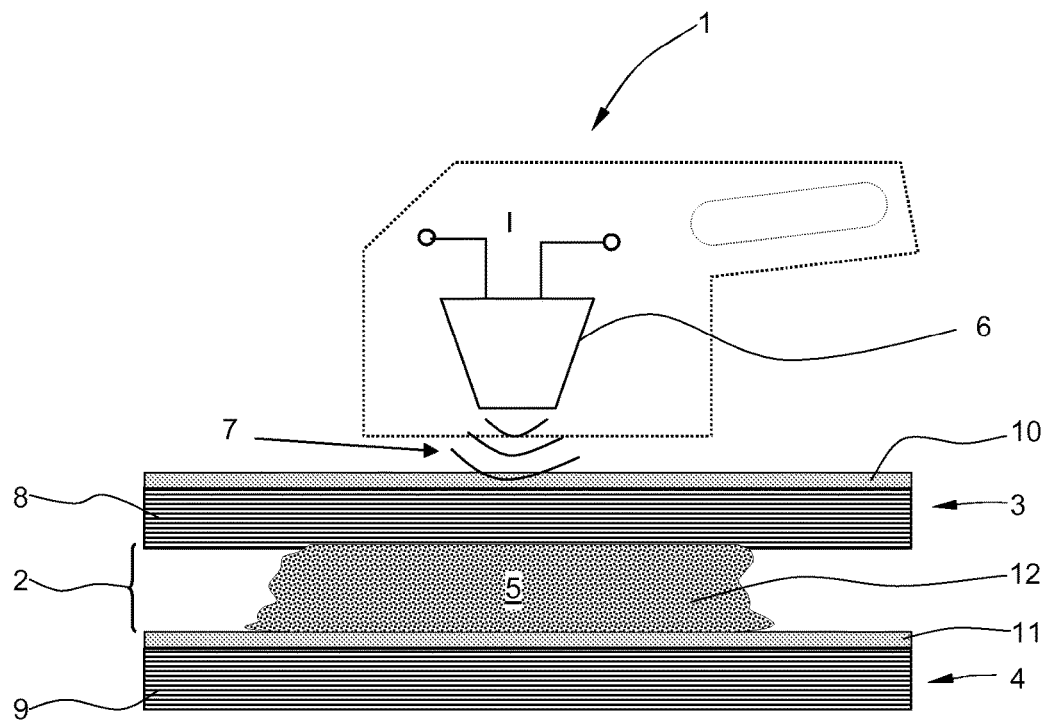
FIG. 1 is a schematic view of a device for joining two components according to an embodiment of the invention.

In the figures, like reference numerals denote like or functionally equivalent components, unless indicated otherwise.

FIG. 1 shows the basic construction of a device 1 for joining two components 3, 4, which in this case form, by way of example, part of the outer skin of an aircraft fuselage structure. The two components 3, 4 are basically constructed using a layer 8, 9 which in each case comprises a carbon-fibre-reinforced epoxy resin. Laminations 10, 11, in particular in the form of a copper woven fabric, a copper lamination or a copper net, which are shown by way of example and are not required for the operation of the present device, are used primarily as lightning arrester means for the aircraft. A plastics material 5, for example a sealant or a filler, is introduced at least in regions in a gap region 2 between the components 3, 4.

A plurality of nanoparticles, of which one particle 12 is representatively provided with a reference numeral, are added to the plastics material 5. The nanoparticles have a diameter of from approximately 1 nm to 100 nm. In the present embodiment, particles of an electrically conductive material having good thermal conductivity, for example a ferrite, are used by way of example. The plastics material 5 itself or the matrix comprising the nanoparticles 12 is, for example, formed using heat-curable two-component epoxy resin systems.

An energy introduction means 6 for introducing energy locally into the solid particles 12, which in the present embodiment is configured by way of example as a microwave radiation source, is located above the first component 3. In alternative embodiments, the energy introduction means 6 can be configured for example as an inductor for producing an induction field, as an ultrasonic source, as a light source for visible and/or infrared light, as a source of terahertz radiation or a source of another form of energy-transporting radiation, the type of energy introduction means and the composition of the nanoparticles being matched to one another in each case in such a way that the energy radiated by the energy introduction means during operation can be absorbed locally by the nanoparticles. In addition, the type of energy introduction means 6 is preferably selected with regard to the material and the structure of the components 3, 4, including any laminations 10, 11, in such a way that a sufficient portion of the radiated energy passes at least those portions of the components 3, 4 which are located between the energy introduction means 6 and the gap region 2.

In the present embodiment, the use of electrically conductive nanoparticles 12 under the effect of the microwave radiation 7 emitted during operation by the energy introduction means 6 causes eddy currents to be produced in the nanoparticles dispersed in the plastics material filler, which currents increase the temperature in the plastics material 5 in such a way that the plastics material 5 cures by heating.

The intensity of the energy radiation emitted by the energy introduction means 6 is selected—in the present invention by means of the strength of current I of a supply current used to feed the energy introduction means 6—in such a way that a temperature of between 40° C. and 90° C. is set over a period of up to one hour in the plastics material 5 to be cured. The plastics material 5 used is, for example, thermosetting polymers having the following designations: EA 9394 A/B produced by Dexter Hyssol®, Redux 870 A/B produced by Hexcel®, EA 9394.2 produced by Dexter Hyssol® or Epibond 1590-3 A/B produced by Vantico®. Alternatively, the plastics material 5 can also be a sealant or sealing agent, for example a two-component polyurethane plastics material. In this configuration, a temperature of approximately 50° C. in the region of the sealing agent is generally sufficient for forced curing.

When using the energy introduction means 6, in particular in the case of a large gap region 2 which is not permeated simultaneously by the radiated energy (in the present case the microwave radiation 7 from the microwave radiation source 6), a positioning means is advantageous, by means of which the energy introduction means 6 can be guided in defined trajectories past the gap region 2 in an automated manner. In this case, a sufficient holding time of the energy introduction means 6 over the gap region 2 is to be provided, in order to effect sufficient thermal curing of the plastics material 5. Alternatively, as shown by the dotted outline in FIG. 1, the energy introduction means 6 can also comprise a handle, for example a grab handle, which makes it possible to use the energy introduction means 6 manually. In this configuration, the energy introduction means 6 preferably has a laser aiming device in order to visualise the spatial sphere of action of the energy radiation 7 produced by the energy introduction means 6 optically on the components 3, 4 for a user in a contact-free manner. As a result, complete curing of the plastics material 5 is ensured.

Figure 2:
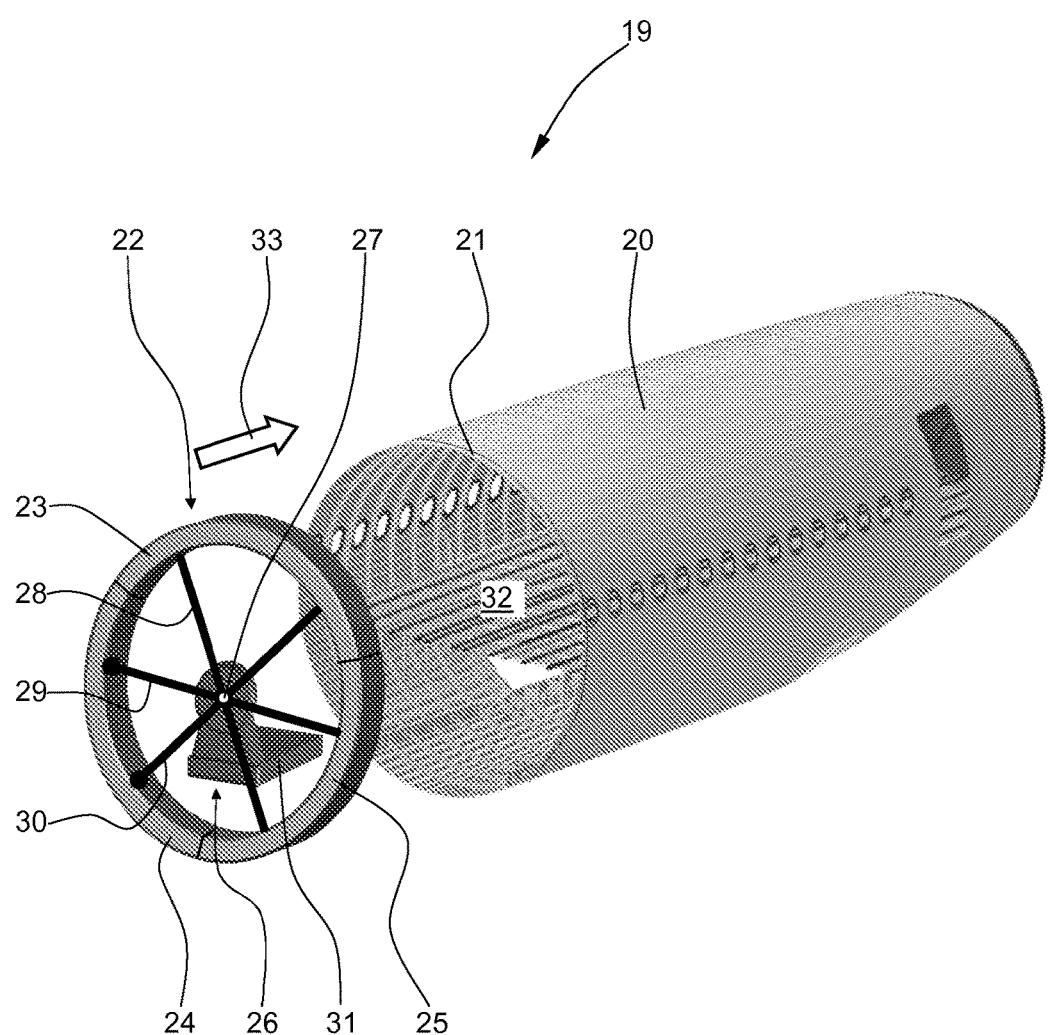
FIG. 2 is a basic perspective view of a device according to a further embodiment for simultaneously curing a complete transverse joint region between fuselage sections which are to be joined.

FIG. 2 shows a variant of a device using which it is possible to cure simultaneously a plastics material filler introduced into a peripheral transverse joint region of a fuselage section.

A further fuselage section (not shown) is connected as a second component to a tail fuselage section 20 as a first component. The device 19 comprises an annular energy introduction means 22, the outer diameter of which—apart from an air gap for tolerance compensation—is adapted approximately to the cross-sectional dimensions or the cross-sectional geometry of the fuselage section 20 in the transverse joint region. In the embodiment shown in FIG. 2, the energy introduction means 22 is constructed as an annular microwave radiation source comprising three adjacent 120° segments 23 to 25. In alternative embodiments, the annular energy introduction means 22 can be configured as an annular inductor, an annular source for example for ultrasound, visible light and/or infrared light, for terahertz and/or microwave radiation or another form of energy-transporting radiation, as described with reference to FIG. 1.

Owing to the generally large cross-sectional dimensions of the fuselage sections to be joined, which may have an inner circumference of up to 25 m depending on the aircraft type and which require an annular energy introduction means 22 having an approximately corresponding outer circumference, it may be necessary to divide said energy introduction means into segments such as the three segments 23 to 25 shown by way of example or a higher number.

A higher number of segments also makes it possible to simplify constructionally any necessary water cooling of the individual segments, since a feed line and a discharge line of relatively small diameter are sufficient for each segment. Segmenting the energy introduction means 22 also reduces the supply power required to supply the individual segments and simplifies the sensitive control system of the segments for actuation, for example by power electronics. Segmenting the energy introduction means 22 also makes it possible to adapt to local variations in the degree of curvature of the fuselage sections which adjoin one another in the transverse joint region 21 and also to adapt to different conditions in the modular system. The modular system makes it possible to assemble the annular energy introduction means 22 in a flexible manner by combining a selection of energy introduction segments from a limited supply of standardised segments, it being possible to adapt the energy introduction means in a simple manner to different cross-sectional geometries and cross-sectional dimensions of fuselage sections. The individual segments can be interconnected by means of a plug-in system, it being possible for an optional locking system to be provided. In the transverse joint region 21, devices for arranging, orientating and temporarily fastening the energy introduction segments can be provided inside the fuselage sections 20.

The annular energy introduction means 22 can also comprise an optional central fastening 26, which comprises a total of three struts 28 to 30 which cross in a mid-point 27, in order to facilitate positioning inside the fuselage section 20. A positioning means 31 or a base plate is arranged in the region of the mid-point 27 and is used to orientate and set up the annular energy introduction means 22 inside an inner region 32 of the fuselage section 20.

In preparation for the use of the device 19, in a conceivable variant the liquid plastics material filler is initially mixed with nanoparticles, the material of which is matched to the form of energy emitted by the energy introduction means. In the present case, nanoparticles consisting of a ferrite are used for example, as in the embodiment of FIG. 1. The plastics material filler comprising the nanoparticles dispersed therein is introduced in the transverse joint region 21 of the fuselage section 20 for filling the gaps and/or for tolerance compensation between components to be joined, for example by surface application with subsequent joining or by injection into pilot holes.

The fully assembled annular energy introduction means 22 is then moved by means of the positioning means 31 in the direction of the arrow 33 into the inner region 32, which is still open on one side, of the fuselage section 20, in such a way that the entire transverse joint region 21 is permeated as fully as possible by the radiated energy of the annular energy introduction means 22, that is to say in the present case by the microwave radiation of the microwave radiation source. The fuselage section to be attached is then orientated in relation to the fuselage section 20 or moved towards it and screwed and/or riveted to it, for example by means of a butt joint using a transverse butt strap. Alternatively, a lap joint without a transverse butt strap can also be provided.

Once the joining process is complete, at least in part, that is to say the fuselage sections are provisionally joined at least to fix the position thereof to a sufficient degree, the plastics material introduced beforehand into the gap region between the fuselage section can be cured by means of the annular energy introduction means 22. The annular energy introduction means 22 can then be dismantled into its three segments 23 to 25 again and removed from the joined fuselage sections together with the positioning means 31 and the struts 28 to 30.

In the event that the fuselage sections to be joined need to be moved apart from one another again anyway both before and after the introduction and curing of the plastics material (liquid shim) required for filling the gaps, the energy introduction means 22 can also be assembled in the fuselage sections which have already been positioned and orientated in relation to one another. Since the fuselage sections have at this point already be equipped with the passenger and hold floors, there are options for supporting, assembling and resting the individual segments or the entire annular energy introduction means 22. The central fastening 26 comprising the positioning means 31 and the struts 28 to 30 or the base plate can be dispensed with if the fuselage sections in the transverse joint region 21 have arrangements (for example frame holders for energy introduction means segments) for temporarily fastening the energy introduction means segments.

Although the present invention has been described herein on the basis of preferred embodiments, it is not restricted thereto, but can be modified in many different ways.

For example, nanoparticles of electrically non-conductive materials or nanoparticles composed heterogeneously of a plurality of materials can be used, in accordance with the form of energy introduced locally.

In the following, preferred embodiments of the invention are described.

Embodiment 1

A Method for joining a first and a second component, at least one of which comprises a fibre-reinforced plastics material, comprising the following steps: arranging the components in relation to one another, leaving a gap region between the first and the second component; filling the gap region, at least in portions, with an uncured plastics material filler in which nanoparticles are dispersed; and introducing energy locally into the nanoparticles in order to cure the plastics material filler.

Embodiment 2

The method according to embodiment 1, wherein the gap region has a width of from 0.3 mm to 2 mm.

Embodiment 3

The method according to either embodiment 1 or embodiment 2, wherein a step of heating the plastics material filler by the local introduction of energy, in particular to between 40° C. and 90° C., in order to cure the plastics material filler is provided.

Embodiment 4

The method according to at least one of the preceding embodiments, wherein a step of stimulating, by the local introduction of energy, a chemical reaction in the plastics material filler, which reaction is catalysed by the nanoparticles, in order to cure the plastics material filler is provided.

Embodiment 5

The method according to at least one of the preceding embodiments, wherein energy is introduced locally by exciting the nanoparticles by means of sound waves, in particular ultrasonic waves.

Embodiment 6

The method according to at least one of the preceding embodiments, wherein energy is introduced locally by exciting the nanoparticles by means of electromagnetic radiation, in particular light, infrared and/or microwave radiation.

Embodiment 7

The method according to at least one of the preceding embodiments, wherein energy is introduced locally by exciting the nanoparticles by means of an electromagnetic induction field.

Embodiment 8

The method according to at least one of the preceding embodiments, wherein energy is introduced locally through the first and/or second component.

Embodiment 9

The method according to at least one of the preceding embodiments, wherein the nanoparticles comprise an electrically conductive material.

Embodiment 10

The method according to at least one of the preceding embodiments, wherein the nanoparticles comprise a material having a higher thermal conductivity than the plastics material filler.

Embodiment 11

The method according to at least one of the preceding embodiments, wherein the nanoparticles comprise, for example, a ferrite and/or a boehmite.

Embodiment 12

A device for joining two components, at least one of which comprises a fibre-reinforced plastics material, an uncured plastics material filler in which nanoparticles are dispersed being introduced, at least in regions, in a gap region between the components; comprising an energy introduction means for introducing energy locally into the nanoparticles in order to cure the plastics material filler.

Embodiment 13

The device according to embodiment 12, wherein the energy introduction means comprises a source of electromagnetic radiation, in particular light, infrared and/or microwave radiation.

Embodiment 14

The device according to either embodiment 12 or embodiment 13, wherein the energy introduction means comprises a source of sound, in particular a source of ultrasound.

Embodiment 15

The device according to at least one of embodiments 12 to 14, wherein the energy introduction means comprises an inductor for producing an electromagnetic induction field.

Embodiment 16

The device according to at least one of embodiments 12 to 15, wherein the energy introduction means is constructed using a plurality of segments, in order to make it possible in particular to cure the plastics material filler simultaneously in a transverse joint region between a fuselage section and a further fuselage section to be attached thereto to produce an aircraft fuselage cell.

LIST OF REFERENCE NUMERALS

1, 19 device
2 gap region
3 first component
4 second component
5 plastics material filler
6, 22 energy introduction means
7 magnetic field
8 layer (CFRP material)
9 layer (CFRP material)
10 lamination
11 lamination
12 nanoparticle
20 fuselage section 21 transverse joint region
23 120° segment
24 120° segment
25 120° segment
26 central fastening
27 mid-point
28 strut
29 strut
30 strut
31 positioning means
32 inner region (fuselage section)
33 arrow

The invention claimed is:

1. A method for tolerance compensation between a first and a second aircraft fuselage shell segment, at least one of which comprises a fiber-reinforced plastics material, comprising:
   arranging, after curing of the fiber-reinforced plastics material to a degree sufficient to make a complete aircraft fuselage cell, the aircraft fuselage shell segments in relation to one another while leaving a gap region having a width of at least 0.3 mm between the first and the second aircraft fuselage shell segment;
   filling the gap region, at least in portions, with an uncured plastics material filler in which nanoparticles are dispersed; and
   introducing energy locally into the nanoparticles by exciting the nanoparticles in the gap region by sound waves in order to cure the plastics material filler.

2. The method according to claim 1, wherein the width of the gap region is 2 mm or less.

3. The method according to claim 1, comprising heating the plastics material filler by the local introduction of energy in order to cure the plastics material filler is provided.

4. The method according to claim 3, wherein the heating of the plastics material filler is performed up to 40° C. to 90° C. in order to cure the plastics material filler.

5. The method according to claim 1, comprising stimulating, by the local introduction of energy, a chemical reaction in the plastics material filler, which reaction is catalysed by the nanoparticles, in order to cure the plastics material filler is provided.

6. The method according to claim 1, wherein the nanoparticles comprise a material having a higher thermal conductivity than the plastics material filler.

7. The method according to claim 1, wherein the nanoparticles comprise a boehmite.

8. The method according to claim 1, wherein energy is introduced locally by exciting the nanoparticles by ultrasonic waves.

9. A method for tolerance compensation between a first and a second aircraft fuselage section, at least one of which comprises a fiber-reinforced plastics material, comprising:
   arranging, after curing of the fiber-reinforced plastics material to a degree sufficient to make a complete aircraft fuselage cell, the aircraft fuselage sections in relation to one another while leaving a gap region having a width of at least 0.3 mm between the first and the second aircraft fuselage section;
   filling the gap region, at least in portions, with an uncured plastics material filler in which nanoparticles are dispersed; and
   introducing energy locally into the nanoparticles by exciting the nanoparticles in the gap region by sound waves in order to cure the plastics material filler.

10. The method according to claim 9, wherein the width of the gap region is 2 mm or less.

11. The method according to claim 9, comprising heating the plastics material filler by the local introduction of energy in order to cure the plastics material filler is provided.

12. The method according to claim 11, wherein the heating of the plastics material filler is performed up to 40° C. to 90° C. in order to cure the plastics material filler.

13. The method according claim 9, comprising stimulating, by the local introduction of energy, a chemical reaction in the plastics material filler, which reaction is catalysed by the nanoparticles, in order to cure the plastics material filler is provided.

14. The method according to claim 9, wherein energy is introduced locally through the first and/or second aircraft fuselage shell segment.

15. The method according to claim 9, wherein energy is introduced locally through the first and/or second aircraft fuselage section.

16. The method according to claim 9, wherein the nanoparticles comprise a material having a higher thermal conductivity than the plastics material filler.

17. The method according to claim 9, wherein the nanoparticles comprise a boehmite.

18. The method according to claim 9, wherein energy is introduced locally by exciting the nanoparticles by ultrasonic waves.

19. The method according to claim 9, comprising curing the plastics material filler simultaneously in a complete transverse joint region between the aircraft fuselage sections is provided.

* * * * *